US012438817B2

(12) United States Patent
Esswie

(10) Patent No.: US 12,438,817 B2
(45) Date of Patent: Oct. 7, 2025

(54) ADAPTIVE RETRANSMISSION OF NON-TERRESTRIAL PAYLOAD

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/490,567

(22) Filed: Oct. 19, 2023

(65) Prior Publication Data
US 2025/0133027 A1    Apr. 24, 2025

(51) Int. Cl.
*H04L 47/2425* (2022.01)
*H04L 47/2483* (2022.01)

(52) U.S. Cl.
CPC ...... *H04L 47/2433* (2013.01); *H04L 47/2483* (2013.01)

(58) Field of Classification Search
CPC ................. H04L 47/2433; H04L 47/2483
See application file for complete search history.

(56) References Cited

U.S. PATENT DOCUMENTS

| | | | |
|---|---|---|---|
| 2018/0262302 A1* | 9/2018 | Bergström | H04L 1/1896 |
| 2022/0078832 A1* | 3/2022 | Elshafie | H04W 72/21 |
| 2023/0060710 A1 | 3/2023 | Dimou et al. | |

FOREIGN PATENT DOCUMENTS

EP    4 090 110    11/2022

OTHER PUBLICATIONS

Nomor Research GMBJ: "Report of Email Discussion [106# 71][NR/NTN] HARQ (Nomor)" 3GPP Draft R2-1908987_EMAIL_HARQ_OPTIONS_FOR_NTR, RAN WG22, Prague, CZ, Aug. 2019, http://www.3gpp.org/ftp/tsg_ran/WG2_RL2/TSGR2_107/Docs/R2-1908987.zip (Year: 2019).*

(Continued)

*Primary Examiner* — Suraj M Joshi
(74) *Attorney, Agent, or Firm* — Amin, Turocy & Watson, LLP

(57) ABSTRACT

A user equipment may receive from a network node a payload notification configuration comprising baseline notification priorities levels and notification priority increment values associated with identifiers of traffic flows. The user equipment may generate a status message, comprising status indications corresponding to payload corresponding to the traffic flows received by the user equipment, to be transmitted according to uplink control channel occasion resources. The user equipment may prioritize status indications in the status message according to baseline notification priorities indicated in the payload notification configuration and based on capacity of the occasion resources to accommodate the status indications. A baseline notification priority corresponding to a status indication not included in the status message may be increased by a notification priority increment such that the status indication is prioritized higher than another status indication, corresponding in the payload notification configuration to a higher baseline notification priority, in a next status message.

20 Claims, 12 Drawing Sheets

(56) References Cited

OTHER PUBLICATIONS

International Search Report and Written Opinion for PCT Application No. PCT/US2024/013879, mailed Jul. 1, 2024, 18 pages.
Nomor Research GMBH: "Report of Email Discussion [106#71] [NR/NTN] HARQ (Nomor)" 11, 3GPP Draft; R2-1908987_EMAIL_HARQ_OPTIONS_FOR_NTN, RAN WG2, Prague, CZ; Aug. 2019; [http://www.3gpp.org/ftp/tsg_ran/WG2_RL2/TSGR2_107/Docs/R2-1908987.zip] 18 pages.

* cited by examiner

220 →

| HARQ process ID | Priority | Feedback priority step |
|---|---|---|
| $y_1$ | 1 (highest) | 0 |
| $y_2$ | 4 | 2 |
| $y_3$ | 9 (lowest) | 6 |

First feedback transfer opportunity/occasion at time t

510

| HARQ process ID | Priority | State |
|---|---|---|
| $y_1$ | 1 (highest) | Delivered |
| $y_2$ | 4 | Delivered |
| $y_3$ | 9 (lowest) | Pending |

520

| HARQ process ID | Priority | State |
|---|---|---|
| $y_1$ | 1 (highest) | Non active |
| $y_2$ | 4 | New feedback available |
| $y_3$ | 3 | Pending |

Second feedback transfer opportunity at time t+1

525

| HARQ process ID | Priority | State |
|---|---|---|
| $y_1$ | 1 (highest) | Non active |
| $y_2$ | 4 | pending |
| $y_3$ | 3 | Delivered |

Avoid HARQ feedback stalling of HARQ process $y_3$

ADAPTIVE RETRANSMISSION OF NON-TERRESTRIAL PAYLOAD

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment from a radio network node, a payload notification configuration comprising at least one flow identifier associated with at least one traffic flow, at least one baseline notification priority, and at least one notification priority increment. The method may comprise receiving, by the user equipment from the radio network node, a first payload corresponding to a first traffic flow of the at least one traffic flow, wherein a first flow identifier of the at least one flow identifier corresponds, in the payload notification configuration, to the first traffic flow, wherein a first baseline notification priority of the at least one baseline notification priority is associated with the first flow identifier in the payload notification configuration, and wherein a first notification priority increment of the at least one notification priority increment is associated with the first baseline notification priority. The method may comprise receiving, by the user equipment from the radio network node, a second payload corresponding to a second traffic flow of the at least one traffic flow, wherein a second flow identifier of the at least one flow identifier corresponds, in the payload notification configuration, to the second traffic flow, wherein a second baseline notification priority of the at least one baseline notification priority is associated with the second flow identifier in the payload notification configuration, and wherein a second notification priority increment of the at least one notification priority increment is associated with the second baseline notification priority. The method may further comprise storing, by the user equipment, at least one first status indication, corresponding to the first payload, to a first buffer portion of the user equipment, and storing, by the user equipment, at least one second status indication, corresponding to the second payload, to a second buffer portion of the user equipment. The method may further comprise transmitting, by the user equipment to the radio network node, a status message, wherein the status message comprises at least one of the at least one first status indication or the at least one second status indication according to at least one of the first baseline notification priority or the second baseline notification priority.

The first baseline notification priority may correspond to a first quality of service associated with the first traffic flow and the second baseline notification priority may correspond to a second quality of service associated with the second traffic flow.

In an embodiment, the method may further comprise determining, by the user equipment, an uplink control channel resource occasion usable by the user equipment to transmit the status message, and prioritizing the at least one first status indication with respect to the at least one second status indication to result in a prioritized status indication, wherein the first baseline notification priority is a higher priority than the second baseline notification priority.

In an embodiment, the status message may be a first status message. The at least one second status indication stored to the second buffer portion of the user equipment may comprise a first second status indication and a second second status indication. The uplink control channel resource occasion may be a first uplink control channel resource occasion having a first capacity that is capable of accommodating transmission of the at least one first status indication and the first second status indication. The first capacity may be incapable of accommodating transmission of the at least one first status indication, the first second status indication, and the second second status indication. The prioritized status indication may be a first prioritized status indication comprising the at least one first status indication and the first second status indication, and the first status message may comprise the first prioritized status indication. The method may further comprise determining, by the user equipment, a second uplink control channel resource occasion, configured to occur after the first uplink control channel resource occasion, usable by the user equipment to transmit a second status message that comprises the second second status indication.

In an embodiment, the at least one first status indication corresponding to the first prioritized status indication may be a first first status indication of the at least one first status indication. The method may further comprise determining, by the user equipment, a second first status indication corresponding to the first payload, and increasing, by the user equipment, the second baseline notification priority by the second notification priority increment to result in an increased notification priority, corresponding to the second payload, wherein the increased notification priority is a higher priority than the first baseline notification priority. The method may further comprise prioritizing, based on the increased notification priority being higher than the first baseline notification priority, the second second status indication with respect to the second first status indication to result in a second prioritized status indication, and transmitting, by the user equipment to the radio network node, a second status message, comprising the second prioritized status indication and excluding the second first status indication, via the second uplink control channel resource occasion, wherein the second uplink control channel resource occasion has a second capacity that is capable of accommodating transmission of the second prioritized status indication, and wherein the second capacity is incapable of accommodating transmission of the second prioritized status indication and the second first status indication.

In an embodiment, the first baseline notification priority may correspond to a first quality of service associated with the first traffic flow. The second baseline notification priority may correspond to a second quality of service associated with the second traffic flow. The second quality of service associated with the second traffic flow may be associated with a latency criterion. The second notification priority increment may correspond to the latency criterion. The prioritizing the second second status indication with respect to the second first status indication may result in the second status message excluding the second first status indication avoids violating the latency criterion.

In an embodiment, the method may further comprise receiving, by the user equipment from the radio network node, a third payload corresponding to a third traffic flow of the at least one traffic flow, wherein a third flow identifier of the at least one flow identifier is indicative in the payload notification configuration of the third traffic flow. The third baseline notification priority of the at least one baseline notification priority may be associated with the third flow identifier in the payload notification configuration. A third notification priority increment of the at least one notification priority increment may be associated with the third baseline notification priority. The method may further comprise storing, by the user equipment, at least one third status indication, corresponding to the third payload, to a third buffer portion of the user equipment. The method may further comprise increasing, by the user equipment, the second baseline notification priority by the second notification priority increment to result in an increased notification priority, corresponding to the second payload, wherein the increased notification priority is higher than the third baseline notification priority. Based on the increased notification priority, the method may further comprise prioritizing the second second status indication with respect to the at least one third status indication to result in a second prioritized status indication, and transmitting, by the user equipment to the radio network node, a second status message, comprising the second prioritized status indication, via the second uplink control channel resource occasion, wherein the second uplink control channel resource occasion has a second capacity that is capable of accommodating transmission of the second prioritized status indication, and wherein the second capacity is incapable of accommodating transmission of the second prioritized status indication and the at least one third status indication.

In an embodiment, the first quality of service associated with the first traffic flow may comprise a first latency criterion. The second quality of service associated with the second traffic flow may comprise a second latency criterion. A third quality of service may be associated with the third traffic flow and may comprise a third latency criterion. The first notification priority increment may correspond to the first latency criterion. The prioritizing the second second status indication with respect to the second first status indication may result in the second status message being transmitted via the second uplink control channel resource occasion. Excluding the second first status indication from being transmitted via the second uplink control channel resource occasion may facilitate avoiding violating the second latency criterion.

In an embodiment, the at least one first status indication may be an acknowledgment (ACK) indication or a negative acknowledgment (NACK) indication. The at least one second status indication may be an ACK indication or a NACK indication. The at least one third status indication may be an ACK indication or a NACK indication.

In an embodiment, the radio network node comprises a non-terrestrial network node.

In another example embodiment, a user equipment may comprise a processor configured to process executable instructions that, when executed by the processor, facilitate performance of operations, comprising receiving, from a radio network node, a payload notification configuration comprising at least one flow identifier associated with at least one traffic flow, at least one baseline notification priority, and at least one notification priority increment. The operations may further comprise receiving, from the radio network node, a first traffic flow of the at least one traffic flow corresponding to, in the payload notification configuration, a first flow identifier of the at least one flow identifier, a first baseline notification priority of the at least one baseline notification priority, and a first notification priority increment of the at least one notification priority increment. The operations may further comprise receiving, from the radio network node, a second traffic flow of the at least one traffic flow corresponding to, in the payload notification configuration, a second flow identifier of the at least one flow identifier, a second baseline notification priority of the at least one baseline notification priority, and a third notification priority increment of the at least one notification priority increment. The operations may further comprise storing a first status indication, corresponding to the first traffic flow, to a first buffer portion of the user equipment, and storing a second status indication, corresponding to the second traffic flow, to a second buffer portion of the user equipment different than the first buffer portion. The operations may further comprise transmitting, to the radio network node, a status message, wherein the status message comprises at least one of the at least one first status indication or the at least one second status indication according to at least one of the first baseline notification priority or the second baseline notification priority.

In an embodiment, the operations may further comprise determining a first uplink control channel resource occasion usable by the user equipment to transmit the status message. The status message may be a first status message. The first status indication stored to the first buffer portion may comprise a first first status indication and a second first status indication. The second status indication stored to the second buffer portion may comprise a first second status indication and a second second status indication. The first uplink control channel resource occasion may have a first capacity that is capable of accommodating transmission of the first first status indication, the second first status indication, and the first second status indication. The first capacity may be incapable of accommodating transmission of the first first status indication, the second first status indication, the first second status indication, and the second second status indication. The first baseline notification priority may correspond to a higher priority than the second baseline notification priority. The prioritizing the first status indication with respect to the second status indication may result in a first prioritized status indication that comprises the first first status indication, the second first status indication, and the first second status indication. The first status message may comprise the first prioritized status indication. The operations may further comprise determining a second uplink control channel resource occasion, configured to occur after the first uplink control channel resource occasion, usable by the user equipment to transmit a second status message that comprises the second second status indication.

In an embodiment, the operations may further comprise receiving, from the radio network node, a third traffic flow. The payload notification configuration may comprise a third flow identifier corresponding to the third traffic flow, a third baseline notification priority associated with the third flow identifier, and a third notification priority increment associated with the third baseline notification priority. The operations may further comprise storing a third status indication, corresponding to the third traffic flow, to a third buffer portion of the user equipment. The operations may further comprise increasing the second baseline notification priority by the second notification priority increment to result in an increased notification priority, corresponding to the second payload. The increased notification priority may be higher than the third baseline notification priority. Based on the increased notification priority, the operations may further comprise prioritizing the second second status indication with respect to the third status indication to result in a second prioritized status indication. The operations may further comprise transmitting, to the radio network node, a second status message, comprising the second prioritized status indication, via the second uplink control channel resource occasion. The second uplink control channel resource occasion may have a second capacity that is capable of accommodating transmission of the second prioritized status indication. The second capacity may be incapable of accommodating transmission of the second prioritized status indication and the third status indication.

In an embodiment, the user equipment may further comprise a memory that comprises the first buffer portion, the second buffer portion, and the third buffer portion.

In an embodiment, the radio network node may comprise a satellite and the user equipment may further comprise circuitry configured to communicate with a satellite.

In yet another example embodiment, a non-transitory machine-readable medium may comprise executable instructions that, when executed by a processor of a user equipment, facilitate performance of operations, comprising receiving, from a radio network node, a payload notification configuration comprising: a first flow identifier associated with a first traffic flow, a first baseline notification priority, and a first notification priority increment; a second flow identifier associated with a second traffic flow, a second baseline notification priority, and a second notification priority increment; and a third flow identifier associated with a third traffic flow, a third baseline notification priority, and a third notification priority increment. The operations may further comprise receiving, from the radio network node, a first payload corresponding to the first traffic flow, a second payload corresponding to the second traffic flow, and a third payload corresponding to the third traffic flow. The operations may further comprise storing, to a memory, a first status indication corresponding to the first traffic flow, a second status indication corresponding to the second traffic flow, and a third status indication corresponding to the third traffic flow. The operations may further comprise transmitting, to the radio network node, a status message, wherein the status message comprises at least one of the first status indication, the second status indication, or the third status indication according to at least one of the first baseline notification priority, the second baseline notification priority, or the third baseline notification priority.

In an embodiment, the first baseline notification priority may correspond to a first quality of service associated with the first traffic flow. The second baseline notification priority may correspond to a second quality of service associated with the second traffic flow. The third baseline notification priority may correspond to a third quality of service associated with the third traffic flow.

In an embodiment, the operations may further comprise determining a first uplink control channel resource occasion usable by the user equipment to transmit the status message. The operations may further comprise prioritizing the first status indication with respect to the second status indication and the third status indication and prioritizing the second status indication with respect to the third status indication to result in a prioritized status indication, wherein the first baseline notification priority corresponds to a higher priority than the second baseline notification priority. The second baseline notification priority may be higher than the third baseline notification priority. The status message may comprise the prioritized status indication.

In an embodiment, the first uplink control channel resource occasion may have a first capacity that is capable of facilitating transmission of the prioritized status indication. The first uplink control channel resource occasion may be incapable of facilitating transmission of the prioritized status indication and the third status indication. The status message may exclude the third status indication.

In an embodiment, the prioritized status indication may be a first prioritized status indication. The first status indication may comprise a first first status indication. The status message may be a first status message. The operations may further comprise increasing the third baseline notification priority by the third notification priority increment to result in an increased notification priority that is higher than the first baseline notification priority. The operations may further comprise determining a second first status indication corresponding to the first traffic flow. Based on the increased notification priority being higher than the first baseline notification priority, the operations may further comprise prioritizing the third status indication with respect to the second first status indication to result in a second prioritized status indication that comprises the third status indication. The operations may further comprise determining a second uplink control channel resource occasion, configured to occur after the first uplink control channel resource occasion, having a second capacity that is capable of facilitating transmission of the second prioritized status indication and that is incapable of facilitating transmission of the of the second prioritized status indication and the second first status indication. The operations may further comprise transmitting, to the radio network node via the second uplink control channel resource occasion, a second status message that comprises the second prioritized status indication. The second status message may exclude the second first status indication.

BRIEF DESCRIPTION OF THE DRAWINGS

FIG. 5 illustrates example prioritizing of feedback status indications.

DETAILED DESCRIPTION OF THE DRAWINGS

Figure 1:
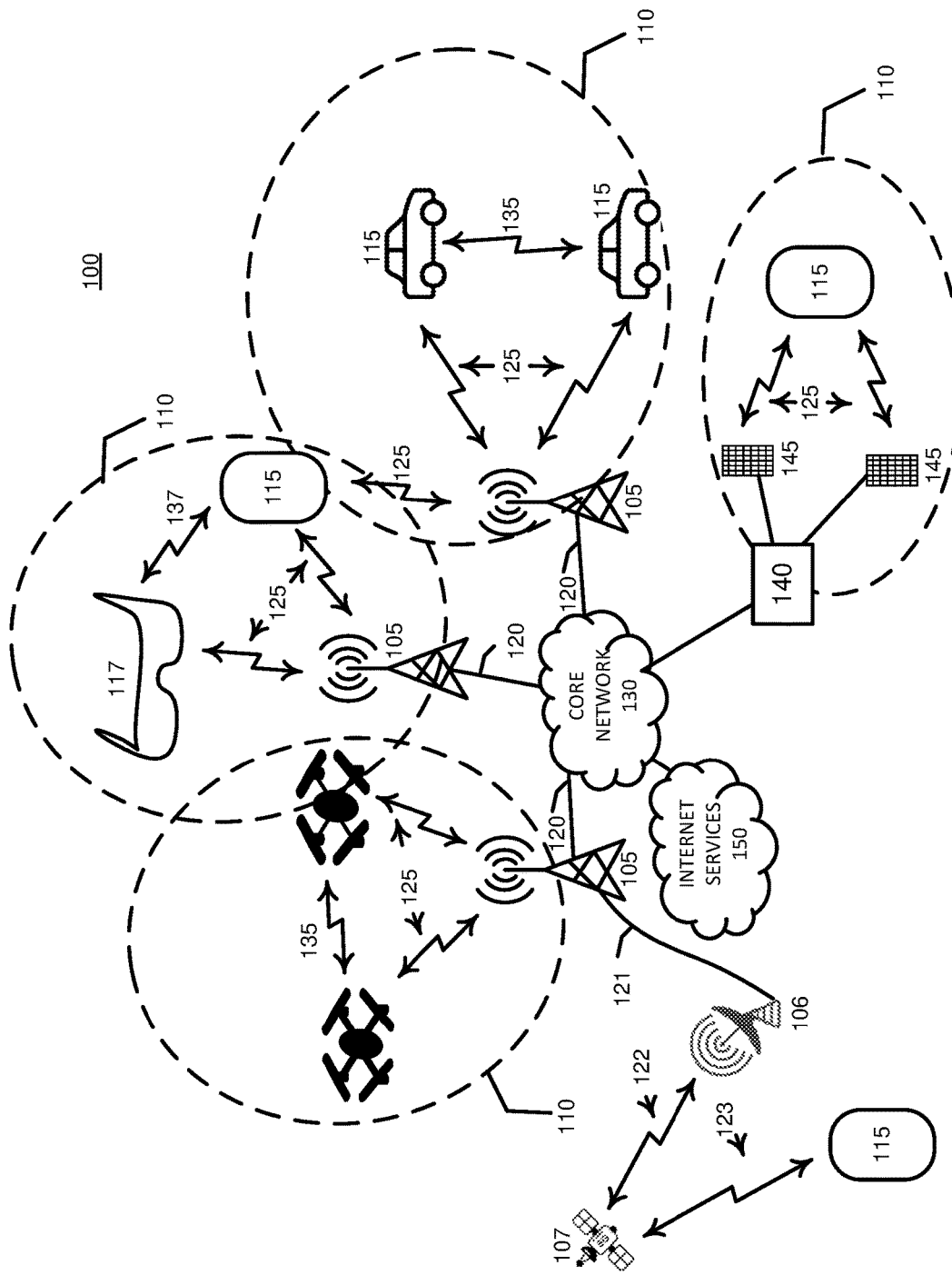
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office).

A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as 5G Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and underserved regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network ("NTN") gateway, and satellite 107 may facilitate delivering traffic corresponding to a radio access network, which may comprise RAN nodes 105, core network 130, backhaul links 120, and long-range wireless links 125, to user equipment that may be located beyond coverage or a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107. Description herein of a radio node or a radio network node may be a reference to either a RAN node 105 or a satellite node 107. Reference to a satellite node, or a non-terrestrial network node, may comprise a reference to satellite 107, base station gateway 107, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient. However, integration of NTNs with ground cellular networks may result in performance-related problems that may not exist, or that may be less problematic, with ground-based radio access networks. For example, to facilitate reliability over the air, HARQ procedures may be used to request payload re-transmission of payload, for example a protocol data unit, such as a packet, from serving RAN nodes, upon failure of a receiving device to decode a first, or subsequent, transmission of the payload. However, due to a relatively large propagation delay between user equipment and NTNs as compared to typical propagation delay between user equipment and ground RAN nodes, (due to the much larger distance from the user equipment to an NTN satellite, NTN propagation delays combined with conventional cellular buffering and scheduling delay may add up to hundreds of milliseconds, which is significantly larger than propagation delay corresponding to user equipment using a conventional ground network. Thus, HARQ procedures and conventional HARQ design, which are aimed at maintaining communication link reliability, are less effective than when used with conventional ground networks.

Cellular integrated NTN (e.g., a network comprising a satellite) communications are challenged with multiple performance limitations, compared to ground-only cellular deployments. The extensively large distance between a serving NTN satellite and a served devices causes certain of the performance-related problems, such as HARQ status indication stalling, which leads to a degraded NTN link reliability. HARQ feedback exchange has been used by devices to provide feedback, either a positive or a negative acknowledgment indication, with respect to packets of a traffic flow received from a serving device, such as a ground-based RAN node. The positive or negative feedback indications may be respectively indicative to a serving RAN node of decoding success or failure of a corresponding packet received by a user equipment. Upon receiving a negative feedback indication from a user equipment, the RAN node may trigger fast packet re-transmissions to quickly retain or recover reliability of the communication link between the user equipment and the RAN node via which the packet was transmitted. Such HARQ feedback exchange and subsequent packet re-transmissions should be performed rapidly, (e.g., faster than a delay, or latency, criterion that may be configured as corresponding to degraded end user experience). If packet retransmission, when needed due to receiving a negative HARQ feedback indication, is not performed according to the latency criterion, the packet may be deemed useless.

For cellular-integrated non-terrestrial networks, delay in transmitting HARQ feedback time may comprise the NTN-specific propagation delay corresponding to a signal reaching an NTN satellite in addition to conventional scheduling/buffering delay. For example, when transmission of NTN HARQ feedback is skipped during a certain uplink control channel resource occasion due to the uplink control channel having reached its capacity with other information, such as other HARQ feedback status indications and thus being incapable of transmitting feedback being skipped, the feedback being skipped may be further buffered until a next available uplink transmission opportunity/occasion. Such behaviour is deemed not problematic with respect to ground-based RAN nodes due to the shorter propagation delay from a user equipment to a ground-based RAN node. However, for NTNs, skipping of a HARQ feedback transmission may result in an entire HARQ feedback status indication becoming useless, due to the extended buffering and additional large propagation delay to deliver such feedback towards the NTN satellite and HARQ feedback stalling.

For example, HARQ feedback (e.g., an ACK status indication or a NACK status indication indicating that a packet is positively or negatively acknowledged, respectively) can be buffered, or stored, at a receiving device, or at a device to which a packet is directed, for a significant amount of time. The large amount of buffering time may result in an extended period before a HARQ ACK/NACK status indication is received by the corresponding NTN satellite that may be due to the extended larger propagation time from the user equipment toward the NTN and due to limited uplink resources corresponding to a given uplink resource occasion configured for transmitting the HARQ feedback status indication to the NTN. In some cases, HARQ feedback/status indication(s) may be received at an NTN after a large delay that results in a packet corresponding to the HARQ status indication not being useful because quality of experience at the user equipment device that transmitted the HARQ status indication impacted, regardless of whether the NTN satellite re-transmits payload corresponding to the status indication. Stranding, or leaving in a buffer, such as a buffer or a memory of a user equipment, a HARQ status indication until the status indication is no longer useful may be referred to a HARQ feedback stall. Conventional techniques may implement disabling HARQ feedback procedures when HARQ feedback stalling has occurred since re-transmissions of a packet corresponding to a received HARQ feedback is deemed not useful, thus reducing signaling overhead that would otherwise be used to transmit useless HARQ feedback/status indication(s).

Embodiments disclosed herein may implement novel adaptive HARQ feedback prioritization techniques that minimize severe HARQ feedback stalling without impacting reliability of UE-NTN link reliability. According to embodiments disclosed herein, an initial HARQ feedback priority, which may be referred to as a baseline notification priority, may be assigned, or configured, for each of one or more traffic flows, which may be referred to as a HARQ flow, or a HARQ process. A baseline notification priority may facilitate a device (e.g., a user equipment) that has received packets corresponding to a traffic flow associated with the baseline notification priority efficiently manage transmission of pending HARQ feedback/status indication by prioritizing transmission of HARQ feedback status indications for different traffic flows according to different baseline notification priorities respectively corresponding to the different traffic flows. Embodiments disclosed herein may facilitate determining that stalling of HARQ feedback status indications is about to occur for a particular HARQ process, and thus stalling is about to occur for all pending HARQ feedback transmission corresponding to the particular HARQ process, and temporarily elevating a notification priority corresponding to the particular HARQ process from a baseline notification priority to an increased notification priority by a configured notification priority increment, corresponding to the particular HARQ process, until the HARQ stalling has been resolved. Thus, in an embodiment, when HARQ stalling is detected, wherein HARQ feedback is consistently blocked from transmission due to either availability of a higher priority HARQ feedback and/or a limited availability of uplink control channel opportunities/occasion resources, and leading to a maximum latency budget/criterion, corresponding to a quality of service, after which the stalled HARQ feedback status indication(s) and corresponding traffic flow payload/packet(s) become useless. Accordingly, embodiments disclosed herein may facilitate avoiding severe HARQ feedback status indication stalling while supporting reliability-enhancing HARQ feedback exchange in an NTN environment.

Adaptive Re-Transmission of Non-Terrestrial Payload.

HARQ stalling may be problematic with cellular-integrated NTN deployments. Conventional techniques implement enabling or disabling HARQ feedback of certain traffic flows to alleviate stalling of HARQ status indication messages. With conventional techniques, when HARQ stalling is experienced, transmission of an entire HARQ feedback status message may be skipped/disabled. According to embodiments disclosed herein a priority-aware HARQ feedback procedure facilitates detecting HARQ stalling. Upon detecting HARQ stalling, a priority corresponding to an about-to-be-stalled HARQ flow/process may be temporarily elevated to alleviate potential stalling. According to embodiments disclosed herein, a priority of initially-lower priority HARQ status indications may be temporarily elevated to alleviate potential HARQ stalls, but higher priority and more HARQ feedback status indications corresponding to more latency-critical traffic may still be prioritized for uplink transmissions of HARQ status indications to retain NTN link reliability with respect to the higher-priority traffic.

According to embodiments disclosed herein, a ground RAN node ("gRAN") and/or an NTN RAN node (e.g., comprising a satellite) may transmit adaptive NTN HARQ feedback priority information in a payload notification configuration, towards user equipment devices establishing network connections that may involve NTN communications. A payload notification configuration may comprise one or more enabled HARQ process identifiers of flow identifiers, for each identifiers an initial transmission priority level indication, which may be referred to as a baseline notification priority, or for each identifier, a priority step up indication, which may be referred to as a notification priority increment. A user equipment may establish a connection towards the gRAN, via direct cellular/5G links or via NTN satellite links in case direct gRAN coverage is not available at the user equipment. For a current uplink control channel that may be usable by the user equipment to carry HARQ feedback, the user equipment may determine, compile, or generate an uplink control information ("UCI") message, which may be referred to as a status message. The user equipment may multiplex buffered HARQ feedback status indications corresponding to different traffic flows in the status message. The user equipment may first select for inclusion in the status message pending HARQ feedback corresponding to a highest baseline notification priority HARQ process/traffic flow as indicated in the payload priority configuration, and then the user equipment may select for inclusion in the status message HARQ feedback status indications according to a second highest baseline notification priority HARQ process/traffic flow, and so on, until a maximum capacity of the configured uplink control channel is reached. Prioritizing HARQ feedback status indications according to baseline notification priorities facilitates transmission of HARQ feedback corresponding to latency-critical traffic flows being reported to the node at a high priority. Remaining HARQ feedback (likely corresponding to lower-priority HARQ processes) are considered still pending for transmission and are skipped or excluded from transmission via the current uplink HARQ feedback transmission opportunity. On condition of skipping at least one HARQ feedback that corresponds to an active HARQ process (e.g., the HARQ feedback status indication was excluded from transmission via one or more previous uplink transmission opportunities), the user equipment may elevate a priority corresponding to the skipped HARQ feedback priority level by a configured step-up priority value associated in the payload notification configuration with an identifier to which the skipped HARQ feedback status indication corresponds. Accordingly, untransmitted HARQ feedback status indications remaining in a buffer of the user equipment may, at least temporarily, have a higher than baseline transmission priority via an upcoming uplink control channel occasion, or opportunity, thus facilitating avoidance of stalling in the buffer of status indications corresponding to the otherwise lower-baseline-priority HARQ processes. Thus, higher priority HARQ feedback may be prioritized for faster transmissions while initially-lower-priority HARQ feedback can temporarily be elevated to higher priority levels if transmission of the lower-priority HARQ feedback status indication via one or more previous uplink control channel transmission opportunities was skipped. By temporarily increasing a lower-baseline priority corresponding to a HARQ feedback status indication by a configured notification priority increment may facilitate avoiding, or minimizing, severe stalling of status indications corresponding to a lower-priority HARQ process, thus maintaining reliability with respect to traffic flows corresponding to the lower baseline notification priorities. Furthermore, due to the dynamic nature of embodiments disclosed herein, for example adaptively stepping up/elevating feedback priority of certain HARQ processes, a notification priority corresponding to a traffic flow having a initially lower baseline notification priority could potentially be increased to a level that exceeds a maximum allowable priority level and that results in an always-higher-priority with respect to other traffic flows that are more latency-critical and that have higher initial baseline notification priorities for HARQ feedback transmissions (e.g., priorities may be thought of as diverging from desired priorities). Accordingly, on condition of a HARQ process exceeding a configured maximum allowable HARQ feedback priority level, a user equipment may reset a current feedback priority corresponding to a HARQ process to an initial HARQ feedback baseline notification priority level as indicated in the payload notification configuration.

Figure 2:
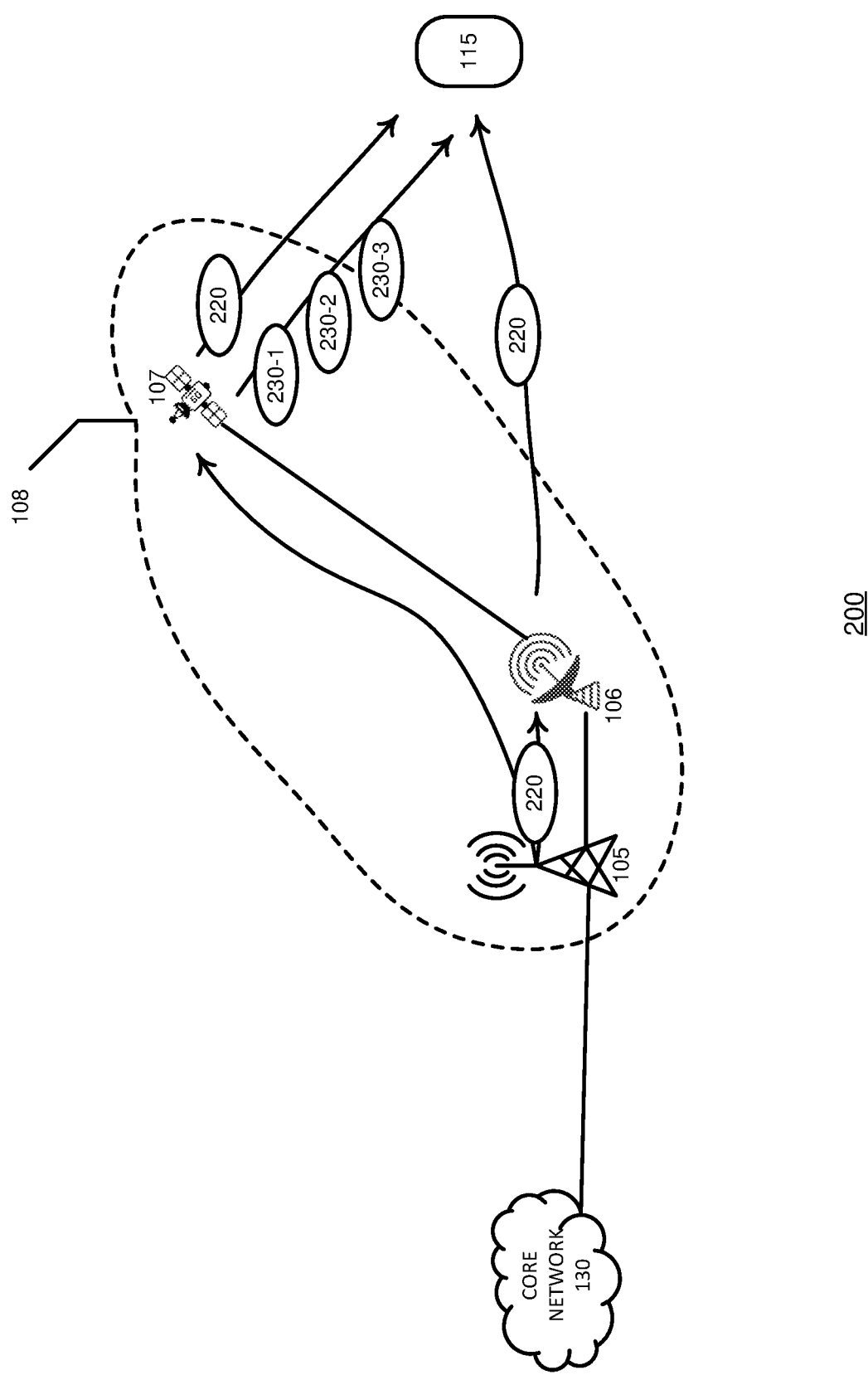
FIG. 2 illustrates an environment with a satellite base station and satellite facilitating communication of traffic corresponding to a radio access network.

Turning now to FIG. 2, the figure illustrates ground-based RAN node 105, base station 106, and NTN node 107, any one or more of which may be referred to as a radio network node. For purposes of description, radio network node 108 may comprise one or more of RAN node 105, gateway 106, or satellite 107. User equipment 115 may receive, from node 108, a payload notification configuration 220. In an embodiment, UE 115 may receive traffic payload corresponding to traffic flows 230-1, 230-2, and 230-3, which may be referred to as a first traffic flow, a second traffic flow, and a third traffic flow, respectively. RAN node 105, gateway 106, and/or NTN satellite node 107, which may comprise a cellular protocol stack, may generate payload notification information in payload notification configuration 220.

Figure 3:
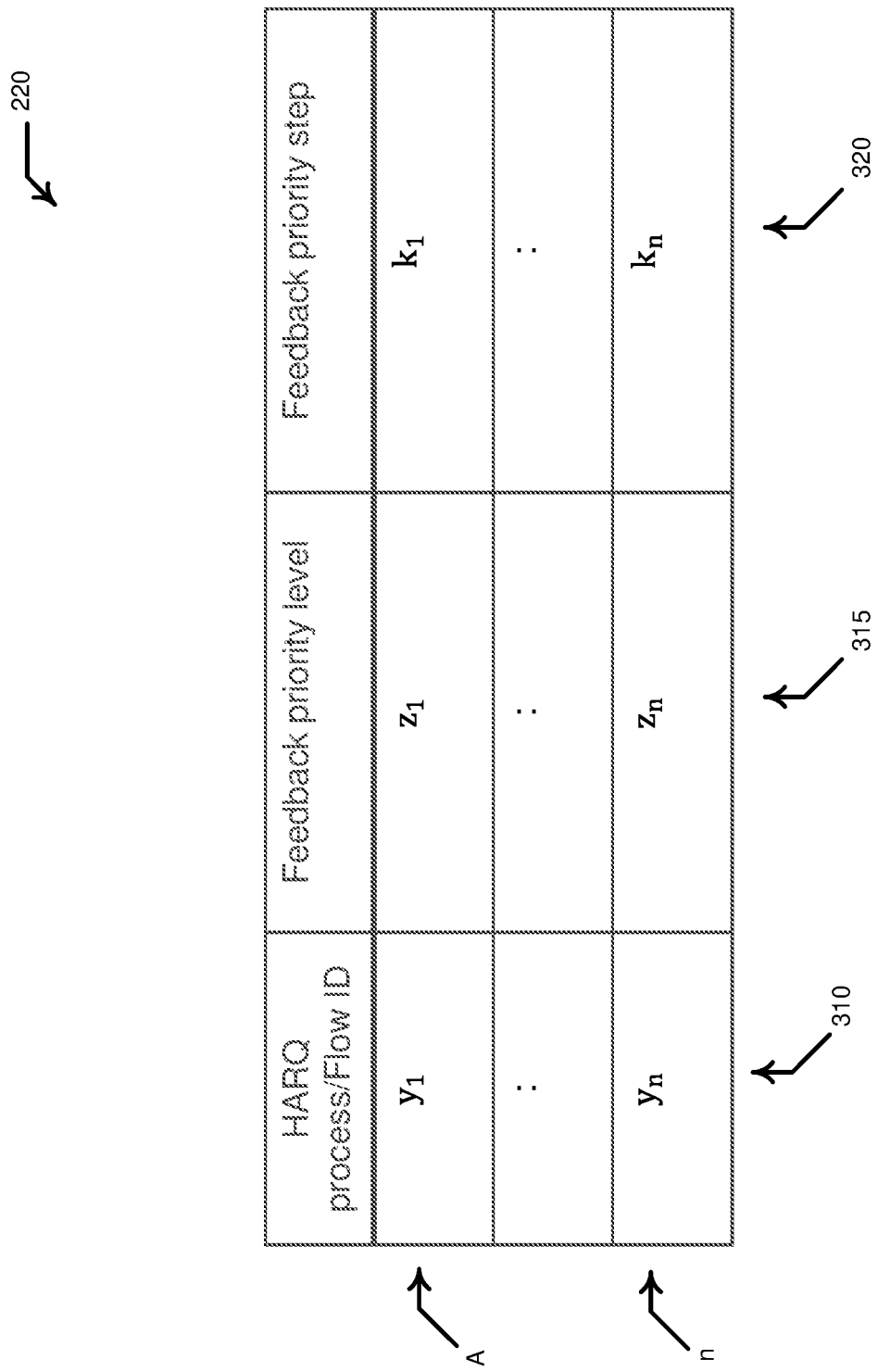
FIG. 3 illustrates an example payload notification configuration.

As shown in FIG. 3, payload notification configuration 220 may comprise one or more flow identifiers 310, or HARQ process identifiers corresponding thereto, that may correspond to traffic flows 230-1, 230-2, and 230-3. Payload notification configuration 220 may comprise one or more HARQ feedback priorities 315, which may be referred to as baseline notification priorities. Payload notification configuration 220 may associate baseline notification priorities 315 with one or more of the flow identifiers 310. An identifier 310 corresponding to an active HARQ process, or corresponding traffic flow, may be associated with a corresponding baseline notification priority 315, or an indication thereof. An identifier 310 may be associated with a corresponding HARQ feedback step-up or elevation priority indication 320, which may be referred to as a notification priority increment, and which may correspond to a flow or HARQ process corresponding to the identifier 310. When user equipment 115 shown in FIG. 2 attempts to establish a radio connection either directly with a RAN node 105 and/or with NTN satellite node 107, the user equipment may receive payload notification configuration 220 as part of a connection establishment RRC signaling message.

Figure 4:
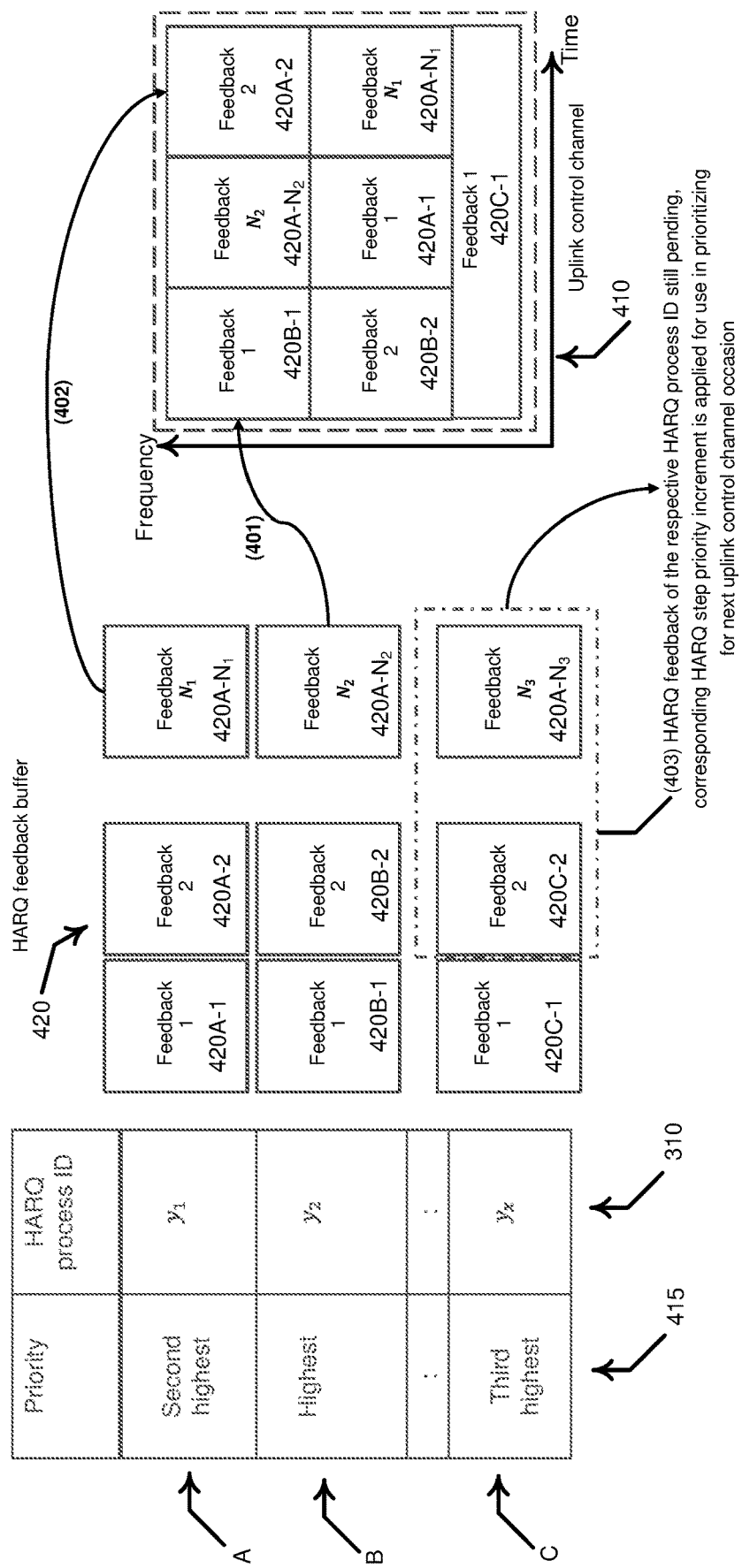
FIG. 4 illustrates an example transmitting of payload status indications according to respective priorities.

Accordingly, as shown in FIG. 4, user equipment 115, shown in FIG. 2, may determine an uplink control channel opportunity/occasion 410 that may be enabled, or usable, to carry available HARQ feedback from the user equipment to one or more components of node 108. User equipment 115 may determine, from payload notification configuration 220, a corresponding HARQ feedback priority corresponding to one or more traffic flows associated with one or more identifiers 310 for one or more pending HARQ feedback indication 420, which may be referred to as status indications. The user equipment may multiplex and encode HARQ feedback status indications 420 that correspond to one or more HARQ processes/flows associated with highest assigned feedback priority levels 415 until a capacity of uplink control channel 410 is reached, (e.g., until uplink control resources corresponding to an occasion are full, or already used, by multiplexed and mapped HARQ feedback status indication(s)), and thus there is no resource availability left in the uplink control channel resource(s) to fit additional HARQ feedback status indications 420. Therefore, the remaining HARQ feedback status indication(s) 420 is/are skipped from being transmitted via current uplink control channel occasion 410 and transmission of the skipped status indication(s) is/are further buffered to be potentially transmitted via a next uplink control channel opportunity/occasion.

As shown in the example in FIG. 4, status indications 420B-1, 420B-2, and 420B-3 corresponding to a traffic flow having a highest notification priority 415B in buffer 420, are configured first for transmission via uplink control channel resource 410. Next, status indications 420A-1, 420A-2, and 420A-3, corresponding to a traffic flow having a second highest notification priority 415A in buffer 420, are configured second for transmission via uplink control channel resource 410. Status indication 420C-1, corresponding to third highest priority 415C-1, can fit within time and frequency resources of uplink control channel occasion 410. However, after configuring occasion 410 to carry status indication 420C-1, the capacity of occasion 410 is full and thus occasion 410 is incapable of accommodating, or carrying, status indications 420C-2 and 420A-$N_3$, which remain buffered, or stored, in buffer 420 until a next uplink control channel resource occasion is available for transmitting status indications. It will be appreciated that although status indications 420C correspond to the third-highest priority 415C, status indication 420C-1 is nevertheless transmitted via occasion 410. It will be appreciated that relative priorities indicated in column 415 in FIG. 4 may represent baseline notification priorities, or increased priorities that are the result of a priority, either a baseline notification priority or another increased priority, being incremented by a notification priority increment.

On condition of skipping/excluding at least one HARQ feedback status indication, corresponding to a certain HARQ process, from transmission over an available uplink control channel opportunity, (e.g., skipping transmission of status indications 420C-2 and 420A-$N_3$ via occasion 410 as described in reference to FIG. 4), a user equipment may dynamically increase, or increment, a priority corresponding to a status indication priority and may use the increased priority to prioritize status indications in a next uplink control channel resource occasion. In the example shown in FIG. 5, three HARQ priorities are defined and signaled towards a served user equipment device, with various priority and priority step-up levels. For purposes of the example shown in FIG. 5, it is assumed that the lower the priority indication the higher priority assigned to the HARQ process. For example, a priority indication of "1" indicates a highest/maximum available HARQ feedback priority. Accordingly, a user equipment may only be able to fit pending HARQ feedback/status indications corresponding to the first and second highest priority traffic flows into an uplink control channel resource occasion as indicated by prioritization, or prioritization state 510. The uplink control channel resource occasion may be incapable of containing status indications corresponding to the lowest priority (e.g., a priority of '9' as shown in FIG. 5) due to resource starvation, or unavailability, of configured resources, corresponding to the currently available uplink control channels occasion. Therefore, the third HARQ feedback process having a priority level of '9', and HARQ feedback/status indication(s) corresponding thereto, is/are skipped/excluded from transmission to a serving node.

Accordingly, the user equipment may elevate, or increase, a feedback priority corresponding to the lowest priority by a configured notification priority increment associated with the traffic flow having the lowest priority. For example, in prioritization 520, the lower priority level of '9' is elevated six '6' levels, using the notification priority increment of '6' shown in payload notification configuration 220, due to transmission of the lowest priority feedback being skipped during a prior uplink control channel resource occasion. After increasing, an increased priority level of previously lowest priority corresponding to process identifier $y_3$ is '3', resulting in a priority associated with identifier $y_3$, at least temporarily, as the second highest prioritized HARQ process as shown in prioritization 520. Thus, transmission of previously-skipped status indication(s) (e.g., not transmitted via an uplink resource occasion at time t) corresponding to HARQ process $y_3$ is prioritized for transmission ahead of status indication(s) corresponding to $y_2$ at a next control transmission opportunity, and thus stalling of transmission of status indications corresponding to identifier $y_3$ may be avoided as indicated in prioritization state 525 (e.g., status indications corresponding to $y_3$ are transmitted via a next uplink resource control channel at time t+1 with respect to the occasion at time t). It will be appreciated that after status indications corresponding to $y_3$ are transmitted at time t+1, a buffer at the user equipment that transmitted the status indications may be empty and the priority level that was elevated from '9' to '3' corresponding to the lowest baseline notification priority level may be reset by the user equipment to the baseline, or initial, notification priority of '9'.

Figure 6:
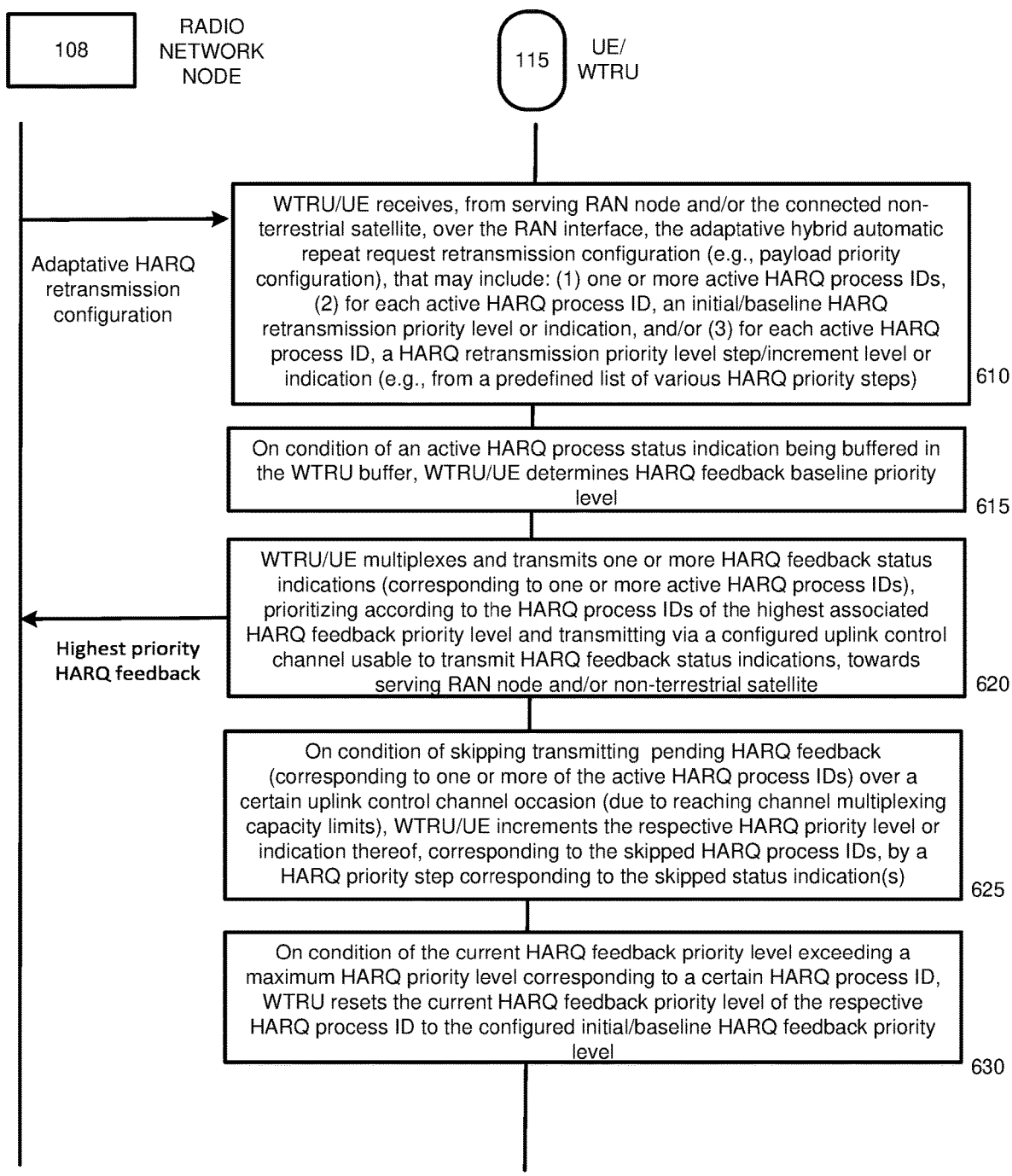
FIG. 6 illustrates a timing diagram of an example embodiment.

Turning now to FIG. 6, the figure illustrates a timing diagram of an example embodiment method 600. At act 610, a user equipment 115 may receive, from a radio network node 108, or from a radio node, an adaptive hybrid automatic repeat request retransmission configurations, such as payload notification configuration 220 described in reference to FIG. 3. Payload notification configuration 220 may comprise one or more active HARQ process/flow identifiers, for each active HARQ process identifier, or flow identifier, an initial, or baseline, HARQ retransmission priority level or indication associated with each HARQ process/flow identifier, such as baseline notification priorities 315 described in reference to FIG. 3, or a HARQ retransmission priority level step level or indication, for example a notification priority increment 320 described in reference to FIG. 3, corresponding to each HARQ process/flow identifier. An indication 320 may be indicative of an increment value, or step value, configured in a list of HARQ priority incrementation values. At act 615, on condition of one or more status indications corresponding to an active HARQ process being in a buffer of WTRU/UE 115, the WTRU/UE may determine a HARQ feedback priority level, or baseline notification priority, corresponding to the one or more status indications. At act 620, WTRU/UE may multiplex (e.g., include HARQ status indications corresponding to different traffic flows/HARQ processes in an uplink resource occasion) and transmit one or more HARQ feedback status indications corresponding to one or more flow identifiers or active HARQ process identifiers. The HARQ feedback status indication may be prioritized in a status message and transmitted via an uplink control channel resource occasion configured to be usable by WTRU/UE 115 to transmit HARQ feedback status indications. The prioritization may be according to a HARQ process/traffic flow identifier corresponding to a highest associated HARQ feedback priority level in baseline notification priorities that may be included in a payload notification configuration received at act 610. The status message may be transmitted via the determined uplink control channel resource occasion towards node 108. At act 625, on condition of skipping transmission of a pending (e.g., already stored to a buffer of WTRU/UE 115) HARQ feedback status indication corresponding to one or more of the active HARQ process/flow identifiers, via the determined uplink control channel resource occasion, due to reaching an uplink control channel resource occasion multiplexing capacity limit, the WTRU/UE may increment a HARQ priority level (e.g., a baseline notification priority) corresponding to a packet, packets, or payload, associated with an identifier corresponding to the skipped status indication(s), by a notification priority increment corresponding to the identifier, to result in an increased notification priority. At act 630, if a current HARQ feedback priority level of a status indication (e.g., a baseline notification priority or an increased notification priority corresponding to a HARQ feedback status indication) exceeds a maximum configured priority level corresponding to a HARQ process/flow identifier associated with the status indication, WTRU/UE 115 may set/reset the current HARQ feedback priority level corresponding to the HARQ process/flow identifier to the baseline notification priority configured via the payload notification configuration received at act 610.

Figure 7:
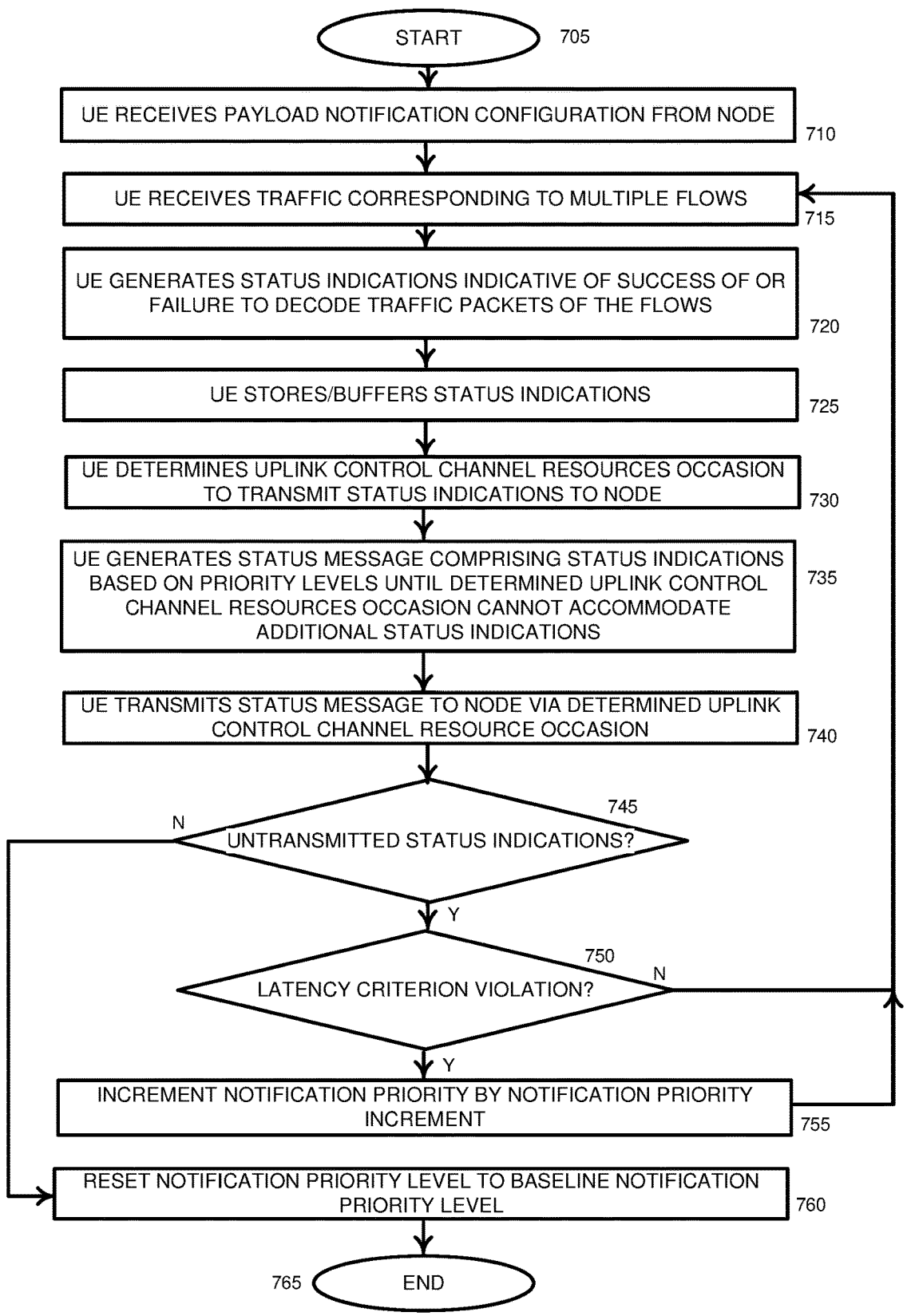
FIG. 7 illustrates a flow diagram of an example embodiment method.

Turning now to FIG. 7, the figure illustrates a flow diagram of an example embodiment 700. Method 700 begins at act 705. At act 710, a user equipment may receive a payload notification configuration from a node. For example, user equipment 115 shown in FIG. 2 may receive payload notification configuration 220 from one of radio access network node 105 or satellite node 107. For purposes of discussion, the term 'node', 'radio node', or 'radio network node', may refer to one or more of radio access network node 105, gateway 106, or satellite 107. Continuing with description of FIG. 7, at act 715, the user equipment may receive traffic payload packets corresponding to one or more traffic flows. Each of the one or more traffic flows may be associated with a different quality of service. The different qualities of service may respectively comprise different criteria, corresponding to the one or more traffic flows, to be applied when reporting, by the user equipment, status indications, for example HARQ acknowledgement or negative acknowledgement indications, in a status message to the serving node that transmitted, or that is transmitting, the one or more traffic flows to the user equipment.

At act 720, the user equipment may generate status indications indicative of success or failure to decode traffic packets corresponding to the one or more traffic flows. At act 725, the user equipment may store the status indications generated at act 720 to a buffer, or memory, of the user equipment. At act 730, the user equipment may determine uplink control channel resources, for example time and frequency resources, corresponding to an uplink control channel occasion usable to transmit status indications to the node that is transmitting, or that transmitted, traffic packets corresponding to the one or more traffic flows.

At act 735 the user equipment may generate a status message comprising status indications generated at act 720 based on priority levels associated with the one or more traffic flows in the payload status indications correspond. The user equipment may 'fill up' resources corresponding to the uplink occasion determined at act 730 according to notification priorities corresponding to the status indications, with status indications corresponding to higher priority levels being prioritized for inclusion for transmission via the uplink occasion to the serving node. The notification priorities, or notification priority levels, may be baseline notification priorities included in payload notification configuration 220 or may be increased notification priorities that may have resulted from applying a notification priority increment that may be included in the payload notification configuration. Upon the user equipment filling up, or assigning, based on notification priority levels, status indications to be transmitted via the uplink occasion determined at act 730 such that the time and frequency resources corresponding to the uplink control channel occasion cannot accommodate additional status indications, the user equipment may buffer status indications generated at act 720, or may facilitate status indications generated at act 720 that are not to be transmitted via the uplink control channel occasion determined at act 730 remaining in the buffer. At act 740, the user equipment may transmit the status message, generated at act 735, to the serving node that transmitted the traffic flows to which the status indications in the status message correspond, according to the uplink control channel resource occasion determined at act 730.

At act 745, the user equipment may determine whether the buffer of the user equipment contains, or retains, one or more status indications generated at act 720 that were not transmitted at act 740. If a determination made at act 745 is that the buffer of the user equipment has been flushed, or does not otherwise contain status indications that were not transmitted at act 740, method 700 advances to act 760. At act 760, the user equipment may set, reset, or leave alone one or more notification priority level(s) corresponding to one or more traffic flows indicated in payload notification configuration 220. For example, if a baseline notification priority corresponding to a traffic flow, or corresponding to a HARQ process identifier, indicated in the payload notification configuration has not been increased by a notification priority increment, the baseline notification priority, which is a current priority because it hasn't been increased, is allowed to remain a current notification priority corresponding to the traffic flow or HARQ process identifier. If on the other hand a notification priority corresponding to a traffic flow or HARQ process has been increased from a baseline notification priority by a notification priority increment corresponding to the baseline notification priority in the payload notification configuration, at act 760 the notification priority corresponding to the traffic flow or HARQ process may be reset to, or allowed to return to, the baseline notification priority corresponding to the traffic flow identifier, or HARQ process identifier, associated with the traffic flow or HARQ process in the payload notification configuration.

Returning to description of act 745, if a determination is made by the user equipment that after transmission of the status message at 740 untransmitted status indications remain in the buffer of the user equipment, method 700 advances to act 750. At act 750, the user equipment may determine whether a latency criterion associated with the traffic flow identifier or HARQ process identifier to which the status indications remaining in the buffer correspond may likely be violated if the status indications are not transmitted at a next uplink control channel resource occasion following the uplink control channel resource occasion determined at act 730. If a determination is made that status indications remaining in the buffer will not result in a latency criterion violation if the status indications are not transmitted at the next uplink control channel resource occasion, method 700 may return to act 715. If a determination is made that status indications remaining in the buffer will result in a latency violation if the status indications are not transmitted at the next uplink control channel resource occasion, method 700 may advance to act 755.

At act 755, the user equipment may increment a notification priority corresponding to the status indications that remain in the buffer after the transmission of the status message at act 740. By incrementing the notification priority, which may comprise increasing a baseline notification priority corresponding to the status indications by a notification priority increment associated with the baseline notification priority in the payload notification configuration, stalling of status indications corresponding to traffic flows associated with a low quality of service, or corresponding to a non-stringent latency criterion, may be minimized or avoided. Avoiding stalling of transmission of status indications, corresponding to a traffic flow having a low baseline notification priority in the payload notification configuration, from a buffer of the user equipment may be facilitated by prioritizing, at a next iteration of act 735, status indications that previously were associated with a baseline priority level lower than status indications associated with a higher baseline priority level, but that have been increased at act 755 by a priority increment, when generating a status message at the next iteration of act 735 after method 700 has returned from act 755 to act 715. As discussed previously, a baseline priority level corresponding to a given traffic flow may have been increased at act 755 by a priority increment to a level that is higher than at least one of one or more baseline notification priority levels corresponding to one or more other traffic flows that are associated with higher qualities of service than the given traffic flow. Thus, higher baseline notification priority levels than is associated with an identifier of the given traffic flow in the payload notification configuration may be superseded, at least temporarily, such that status indications corresponding to the given traffic flow may be prioritized at act 735 with respect to status indications corresponding to the other traffic flows, but at act 760 the increased notification priority corresponding to the given traffic flow may be reduced, or allowed to return to, the baseline notification priority level corresponding to the given traffic flow. Method 700 ends at act 765.

Figure 8:
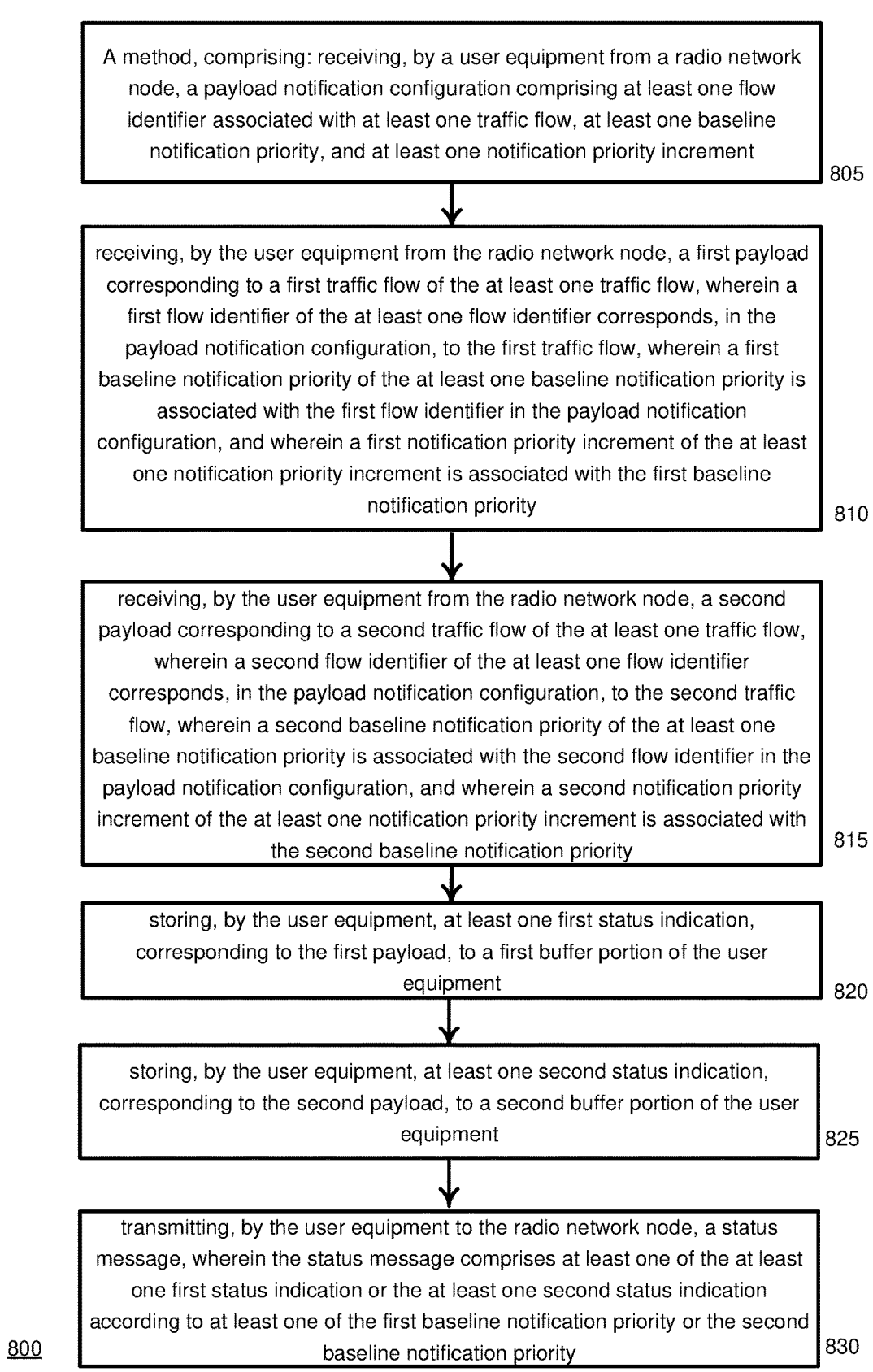
FIG. 8 illustrates a block diagram of an example method embodiment.

Turning now to FIG. 8, the figure illustrates an example embodiment method 800 comprising at block 805 receiving, by a user equipment from a radio network node, a payload notification configuration comprising at least one flow identifier associated with at least one traffic flow, at least one baseline notification priority, and at least one notification priority increment; at block 810 receiving, by the user equipment from the radio network node, a first payload corresponding to a first traffic flow of the at least one traffic flow, wherein a first flow identifier of the at least one flow identifier corresponds, in the payload notification configuration, to the first traffic flow, wherein a first baseline notification priority of the at least one baseline notification priority is associated with the first flow identifier in the payload notification configuration, and wherein a first notification priority increment of the at least one notification priority increment is associated with the first baseline notification priority; at block 815 receiving, by the user equipment from the radio network node, a second payload corresponding to a second traffic flow of the at least one traffic flow, wherein a second flow identifier of the at least one flow identifier corresponds, in the payload notification configuration, to the second traffic flow, wherein a second baseline notification priority of the at least one baseline notification priority is associated with the second flow identifier in the payload notification configuration, and wherein a second notification priority increment of the at least one notification priority increment is associated with the second baseline notification priority; at block 820 storing, by the user equipment, at least one first status indication, corresponding to the first payload, to a first buffer portion of the user equipment; at block 825 storing, by the user equipment, at least one second status indication, corresponding to the second payload, to a second buffer portion of the user equipment; and at block 830 transmitting, by the user equipment to the radio network node, a status message, wherein the status message comprises at least one of the at least one first status indication or the at least one second status indication according to at least one of the first baseline notification priority or the second baseline notification priority.

Figure 9:
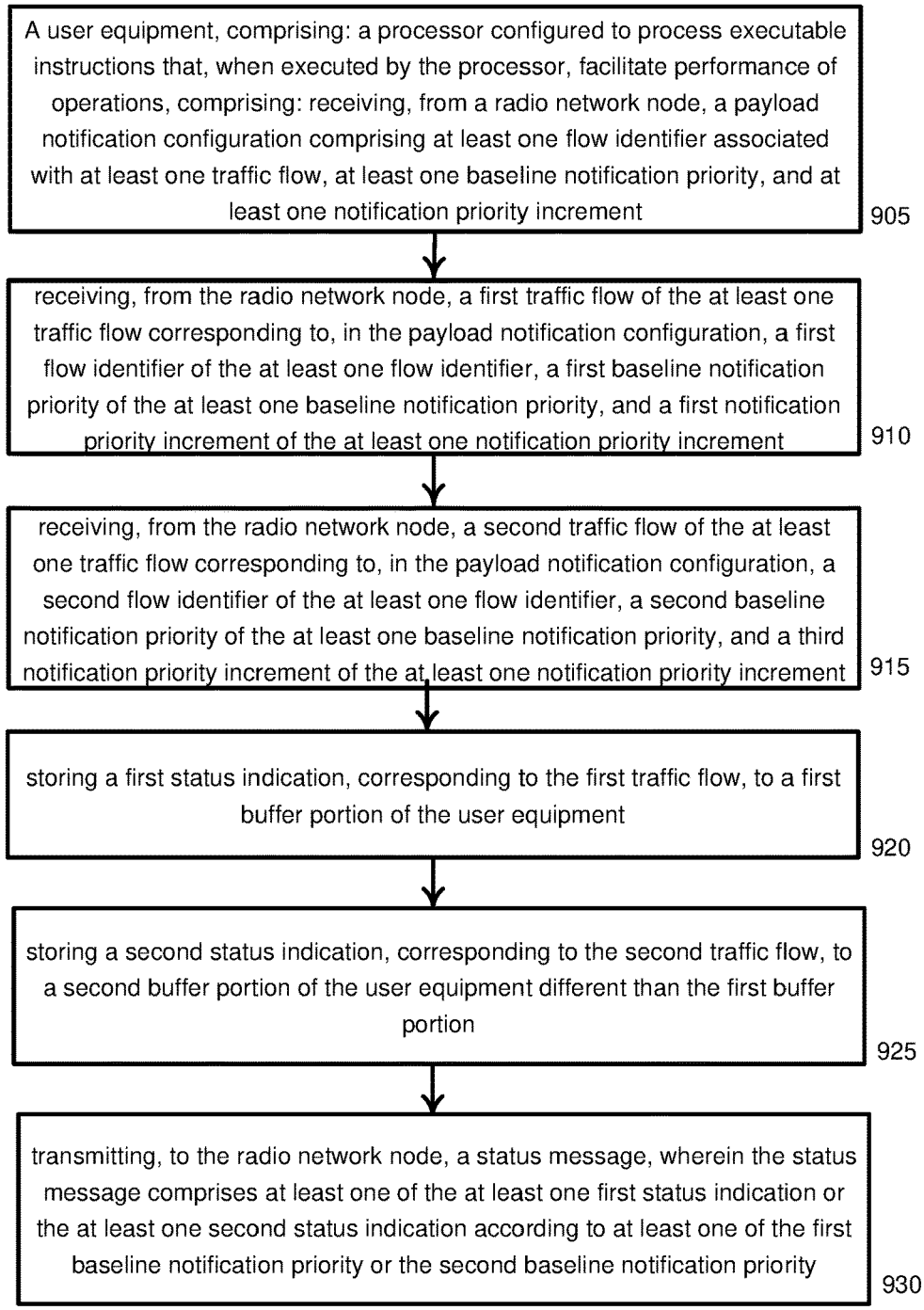
FIG. 9 illustrates a block diagram of an example user equipment.

Turning now to FIG. 9, the figure illustrates an example user equipment 900, comprising at block 905 a processor configured to process executable instructions that, when executed by the processor, facilitate performance of operations, comprising receiving, from a radio network node, a payload notification configuration comprising at least one flow identifier associated with at least one traffic flow, at least one baseline notification priority, and at least one notification priority increment; at block 910 receiving, from the radio network node, a first traffic flow of the at least one traffic flow corresponding to, in the payload notification configuration, a first flow identifier of the at least one flow identifier, a first baseline notification priority of the at least one baseline notification priority, and a first notification priority increment of the at least one notification priority increment; at block 915 receiving, from the radio network node, a second traffic flow of the at least one traffic flow corresponding to, in the payload notification configuration, a second flow identifier of the at least one flow identifier, a second baseline notification priority of the at least one baseline notification priority, and a third notification priority increment of the at least one notification priority increment; at block 920 storing a first status indication, corresponding to the first traffic flow, to a first buffer portion of the user equipment; at block 925 storing a second status indication, corresponding to the second traffic flow, to a second buffer portion of the user equipment different than the first buffer portion; and at block 930 transmitting, to the radio network node, a status message, wherein the status message comprises at least one of the at least one first status indication or the at least one second status indication according to at least one of the first baseline notification priority or the second baseline notification priority.

Figure 10:
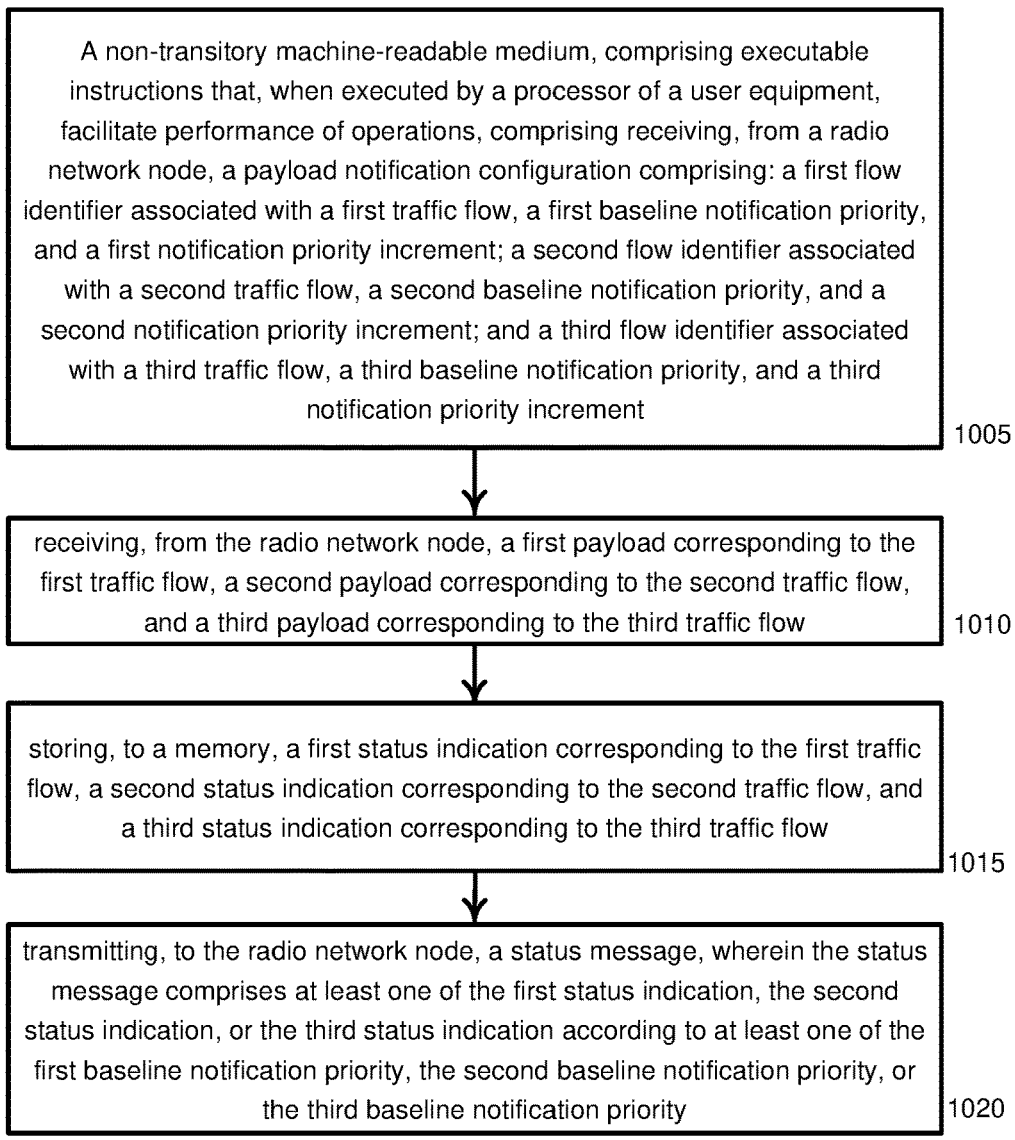
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of a user equipment, facilitate performance of operations, comprising receiving, from a radio network node, a payload notification configuration comprising: a first flow identifier associated with a first traffic flow, a first baseline notification priority, and a first notification priority increment; a second flow identifier associated with a second traffic flow, a second baseline notification priority, and a second notification priority increment; and a third flow identifier associated with a third traffic flow, a third baseline notification priority, and a third notification priority increment; at block 1010 receiving, from the radio network node, a first payload corresponding to the first traffic flow, a second payload corresponding to the second traffic flow, and a third payload corresponding to the third traffic flow; at block 1015 storing, to a memory, a first status indication corresponding to the first traffic flow, a second status indication corresponding to the second traffic flow, and a third status indication corresponding to the third traffic flow; and at block 1020 transmitting, to the radio network node, a status message, wherein the status message comprises at least one of the first status indication, the second status indication, or the third status indication according to at least one of the first baseline notification priority, the second baseline notification priority, or the third baseline notification priority.

Figure 11:
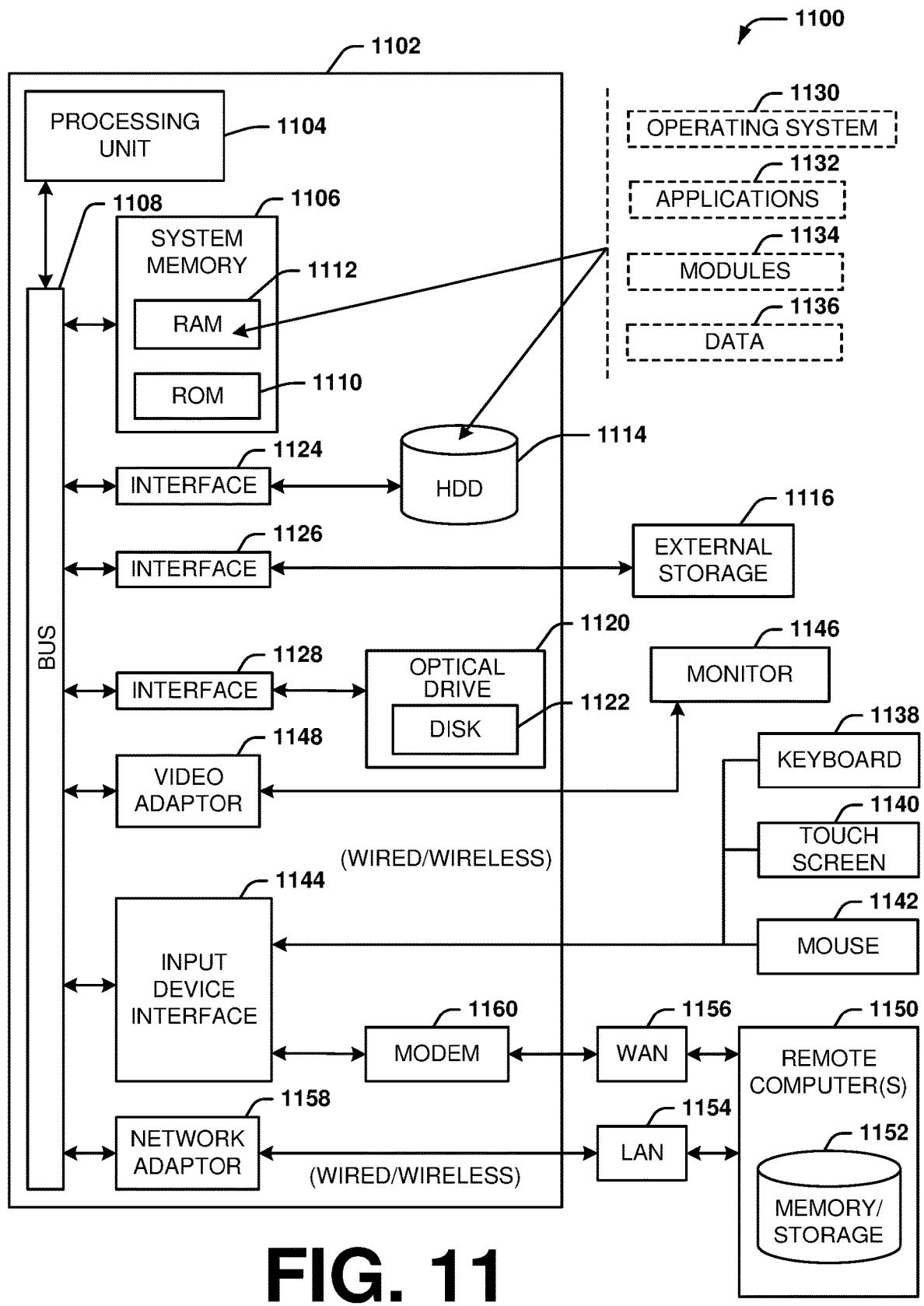
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1111 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1111 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
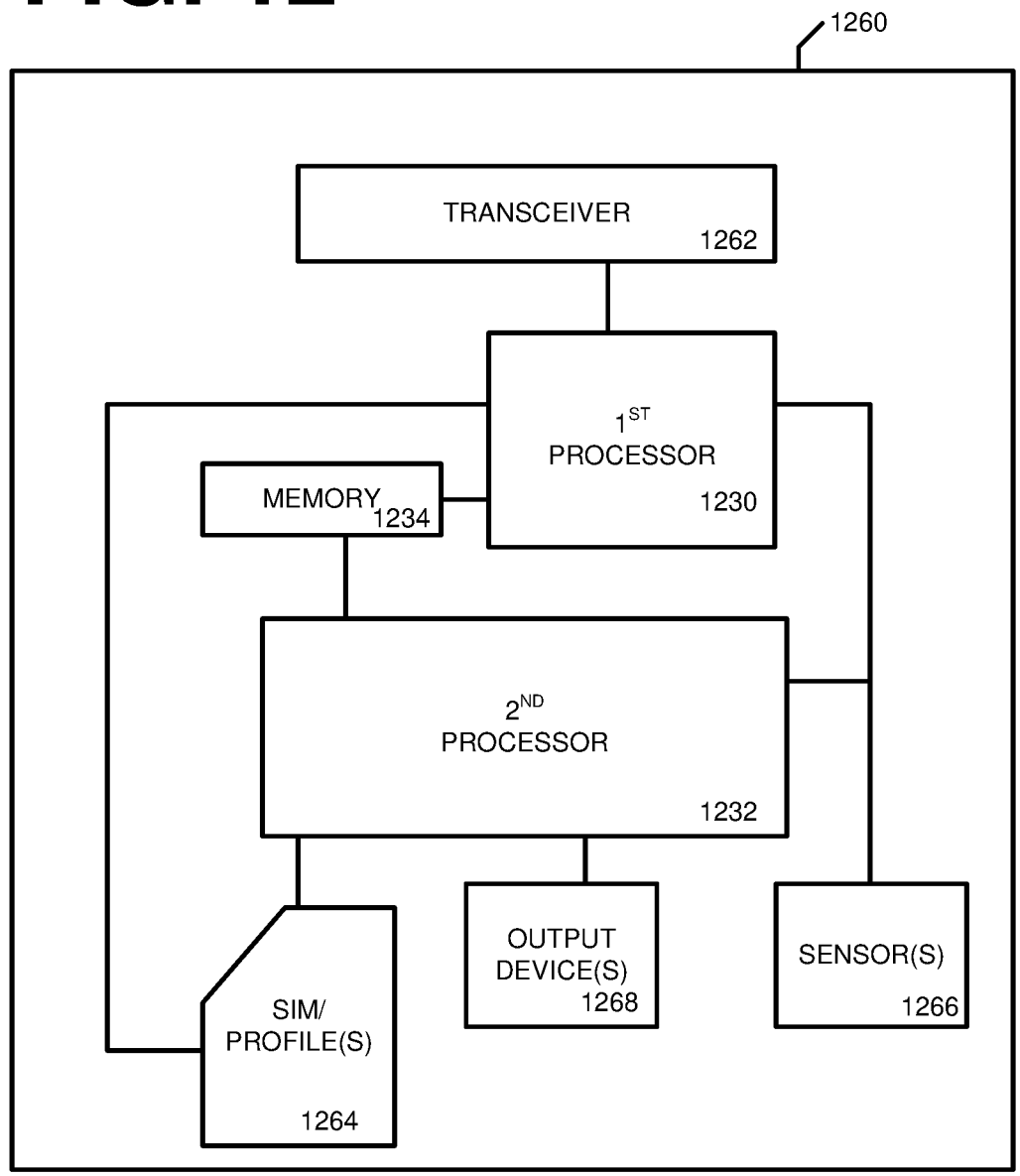
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a user equipment from a radio network node, a payload notification configuration comprising at least one flow identifier associated with at least one traffic flow, at least one baseline notification priority, and at least one notification priority increment;
receiving, by the user equipment from the radio network node, a first payload corresponding to a first traffic flow of the at least one traffic flow, wherein a first flow identifier of the at least one flow identifier corresponds, in the payload notification configuration, to the first traffic flow, wherein a first baseline notification priority of the at least one baseline notification priority is associated with the first flow identifier in the payload notification configuration, and wherein a first notification priority increment of the at least one notification priority increment is associated with the first baseline notification priority;
receiving, by the user equipment from the radio network node, a second payload corresponding to a second traffic flow of the at least one traffic flow, wherein a second flow identifier of the at least one flow identifier corresponds, in the payload notification configuration, to the second traffic flow, wherein a second baseline notification priority of the at least one baseline notification priority is associated with the second flow identifier in the payload notification configuration, and wherein a second notification priority increment of the at least one notification priority increment is associated with the second baseline notification priority;
storing, by the user equipment, at least one first status indication, corresponding to the first payload, to a first buffer portion of the user equipment;
storing, by the user equipment, at least one second status indication, corresponding to the second payload, to a second buffer portion of the user equipment; and
transmitting, by the user equipment to the radio network node, a status message, wherein the status message comprises at least one of the at least one first status indication or the at least one second status indication according to at least one of the first baseline notification priority or the second baseline notification priority.

2. The method of claim 1, wherein the first baseline notification priority corresponds to a first quality of service associated with the first traffic flow and wherein the second baseline notification priority corresponds to a second quality of service associated with the second traffic flow.

3. The method of claim 1, further comprising:
determining, by the user equipment, an uplink control channel resource occasion usable by the user equipment to transmit the status message; and
prioritizing the at least one first status indication with respect to the at least one second status indication to result in a prioritized status indication, wherein the first baseline notification priority is a higher priority than the second baseline notification priority.

4. The method of claim 3, wherein the status message is a first status message, wherein the at least one second status indication stored to the second buffer portion of the user equipment comprises a first second status indication and a second second status indication, wherein the uplink control channel resource occasion is a first uplink control channel resource occasion having a first capacity that is capable of accommodating transmission of the at least one first status indication and the first second status indication, wherein the first capacity is incapable of accommodating transmission of the at least one first status indication, the first second status indication, and the second second status indication, wherein the prioritized status indication is a first prioritized status indication comprising the at least one first status indication and the first second status indication, and wherein the first status message comprises the first prioritized status indication, the method further comprising:
determining, by the user equipment, a second uplink control channel resource occasion, configured to occur after the first uplink control channel resource occasion, usable by the user equipment to transmit a second status message that comprises the second second status indication.

5. The method of claim 4, wherein the at least one notification priority increment is to be usable by the user equipment to determine at least one change with respect to the at least one baseline notification priority, wherein the at least one first status indication corresponding to the first prioritized status indication is a first first status indication of the at least one first status indication, the method further comprising:
determining, by the user equipment, a second first status indication corresponding to the first payload;
increasing, by the user equipment, the second baseline notification priority by the second notification priority increment to result in an increased notification priority, corresponding to the second payload, wherein the increased notification priority is a higher priority than the first baseline notification priority;
prioritizing, based on the increased notification priority being higher than the first baseline notification priority, the second second status indication with respect to the second first status indication to result in a second prioritized status indication; and
transmitting, by the user equipment to the radio network node, a second status message, comprising the second prioritized status indication and excluding the second first status indication, via the second uplink control channel resource occasion, wherein the second uplink control channel resource occasion has a second capacity that is capable of accommodating transmission of the second prioritized status indication, and wherein the second capacity is incapable of accommodating transmission of the second prioritized status indication and the second first status indication.

6. The method of claim 5, wherein the first baseline notification priority corresponds to a first quality of service associated with the first traffic flow, wherein the second baseline notification priority corresponds to a second quality of service associated with the second traffic flow, wherein the second quality of service associated with the second traffic flow is associated with a latency criterion, wherein the second notification priority increment corresponds to the latency criterion, and wherein the prioritizing the second second status indication with respect to the second first status indication to result in the second status message excluding the second first status indication avoids violating the latency criterion.

7. The method of claim 4, wherein the at least one notification priority increment is to be usable by the user equipment to determine at least one change with respect to the at least one baseline notification priority, the method further comprising:
receiving, by the user equipment from the radio network node, a third payload corresponding to a third traffic flow of the at least one traffic flow, wherein a third flow identifier of the at least one flow identifier is indicative in the payload notification configuration of the third traffic flow, wherein a third baseline notification priority of the at least one baseline notification priority is associated with the third flow identifier in the payload notification configuration, and wherein a third notification priority increment of the at least one notification priority increment is associated with the third baseline notification priority;

storing, by the user equipment, at least one third status indication, corresponding to the third payload, to a third buffer portion of the user equipment;

increasing, by the user equipment, the second baseline notification priority by the second notification priority increment to result in an increased notification priority, corresponding to the second payload, wherein the increased notification priority is higher than the third baseline notification priority;

based on the increased notification priority, prioritizing the second second status indication with respect to the at least one third status indication to result in a second prioritized status indication; and transmitting, by the user equipment to the radio network node, a second status message, comprising the second prioritized status indication, via the second uplink control channel resource occasion, wherein the second uplink control channel resource occasion has a second capacity that is capable of accommodating transmission of the second prioritized status indication, and wherein the second capacity is incapable of accommodating transmission of the second prioritized status indication and the at least one third status indication.

8. The method of claim 7, wherein the first quality of service associated with the first traffic flow comprises a first latency criterion, wherein the second quality of service associated with the second traffic flow comprises a second latency criterion, wherein a third quality of service is associated with the third traffic flow and comprises a third latency criterion, wherein the first notification priority increment corresponds to the first latency criterion, and wherein the prioritizing the second second status indication with respect to the second first status indication to result in the second status message being transmitted via the second uplink control channel resource occasion and excluding the second first status indication from being transmitted via the second uplink control channel resource occasion facilitates avoiding violating the second latency criterion.

9. The method of claim 8, wherein the at least one first status indication is an acknowledgment (ACK) indication or a negative acknowledgment (NACK) indication, wherein the at least one second status indication is an ACK indication or a NACK indication, and wherein the at least one third status indication is an ACK indication or a NACK indication.

10. The method of claim 1, wherein the radio network node comprises a non-terrestrial network node.

11. A user equipment, comprising:
a processor configured to process executable instructions that, when executed by the processor, facilitate performance of operations, comprising:
receiving, from a radio network node, a payload notification configuration comprising at least one flow identifier associated with at least one traffic flow, at least one baseline notification priority, and at least one notification priority increment;
receiving, from the radio network node, a first traffic flow of the at least one traffic flow corresponding to, in the payload notification configuration, a first flow identifier of the at least one flow identifier, a first baseline notification priority of the at least one baseline notification priority, and a first notification priority increment of the at least one notification priority increment;
receiving, from the radio network node, a second traffic flow of the at least one traffic flow corresponding to, in the payload notification configuration, a second flow identifier of the at least one flow identifier, a second baseline notification priority of the at least one baseline notification priority, and a third notification priority increment of the at least one notification priority increment;
storing a first status indication, corresponding to the first traffic flow, to a first buffer portion of the user equipment;
storing a second status indication, corresponding to the second traffic flow, to a second buffer portion of the user equipment different than the first buffer portion; and
transmitting, to the radio network node, a status message, wherein the status message comprises at least one of the at least one first status indication or the at least one second status indication according to at least one of the first baseline notification priority or the second baseline notification priority.

12. The user equipment of claim 11, wherein the operations further comprise:
determining a first uplink control channel resource occasion usable by the user equipment to transmit the status message, wherein the status message is a first status message, wherein the first status indication stored to the first buffer portion comprises a first first status indication and a second first status indication, wherein the second status indication stored to the second buffer portion comprises a first second status indication and a second second status indication, wherein the first uplink control channel resource occasion has a first capacity that is capable of accommodating transmission of the first first status indication, the second first status indication, and the first second status indication, wherein the first capacity is incapable of accommodating transmission of the first first status indication, the second first status indication, the first second status indication, and the second second status indication, wherein the first baseline notification priority corresponds to a higher priority than the second baseline notification priority;

prioritizing the first status indication with respect to the second status indication to result in a first prioritized status indication comprising the first first status indication, the second first status indication, and the first second status indication, wherein the first status message comprises the first prioritized status indication; and determining a second uplink control channel resource occasion, configured to occur after the first uplink control channel resource occasion, usable by the user equipment to transmit a second status message that comprises the second second status indication.

13. The user equipment of claim 12, the operations further comprising:
receiving, from the radio network node, a third traffic flow, wherein the payload notification configuration comprises a third flow identifier corresponding to the third traffic flow, a third baseline notification priority associated with the third flow identifier, and a third notification priority increment associated with the third baseline notification priority;

storing a third status indication, corresponding to the third traffic flow, to a third buffer portion of the user equipment;

increasing the second baseline notification priority by the second notification priority increment to result in an increased notification priority, corresponding to the second payload, wherein the increased notification priority is higher than the third baseline notification priority;

based on the increased notification priority, prioritizing the second second status indication with respect to the third status indication to result in a second prioritized status indication; and transmitting, to the radio network node, a second status message, comprising the second prioritized status indication, via the second uplink control channel resource occasion, wherein the second uplink control channel resource occasion has a second capacity that is capable of accommodating transmission of the second prioritized status indication, and wherein the second capacity is incapable of accommodating transmission of the second prioritized status indication and the third status indication.

14. The user equipment of claim 13, further comprising:
a memory that comprises the first buffer portion, the second buffer portion, and the third buffer portion.

15. The user equipment of claim 11, wherein the radio network node comprises a satellite, and further comprising:
circuitry configured to communicate with a satellite.

16. A non-transitory machine-readable medium, comprising executable instructions that, when executed by a processor of a user equipment, facilitate performance of operations, comprising:
receiving, from a radio network node, a payload notification configuration comprising: a first flow identifier associated with a first traffic flow, a first baseline notification priority, and a first notification priority increment; a second flow identifier associated with a second traffic flow, a second baseline notification priority, and a second notification priority increment; and a third flow identifier associated with a third traffic flow, a third baseline notification priority, and a third notification priority increment;

receiving, from the radio network node, a first payload corresponding to the first traffic flow, a second payload corresponding to the second traffic flow, and a third payload corresponding to the third traffic flow;

storing, to a memory, a first status indication corresponding to the first traffic flow, a second status indication corresponding to the second traffic flow, and a third status indication corresponding to the third traffic flow; and transmitting, to the radio network node, a status message, wherein the status message comprises at least one of the first status indication, the second status indication, or the third status indication according to at least one of the first baseline notification priority, the second baseline notification priority, or the third baseline notification priority.

17. The non-transitory machine-readable medium of claim 16, wherein the first baseline notification priority corresponds to a first quality of service associated with the first traffic flow, wherein the second baseline notification priority corresponds to a second quality of service associated with the second traffic flow, and wherein the third baseline notification priority corresponds to a third quality of service associated with the third traffic flow.

18. The non-transitory machine-readable medium of claim 16, wherein the operations further comprise:
determining a first uplink control channel resource occasion usable by the user equipment to transmit the status message; and prioritizing the first status indication with respect to the second status indication and the third status indication and prioritizing the second status indication with respect to the third status indication to result in a prioritized status indication, wherein the first baseline notification priority corresponds to a higher priority than the second baseline notification priority, wherein the second baseline notification priority is higher than the third baseline notification priority, and wherein the status message comprises the prioritized status indication.

19. The non-transitory machine-readable medium of claim 17, wherein the first uplink control channel resource occasion has a first capacity that is capable of facilitating transmission of the prioritized status indication, wherein the first uplink control channel resource occasion is incapable of facilitating transmission of the prioritized status indication and the third status indication, and wherein the status message excludes the third status indication.

20. The non-transitory machine-readable medium of claim 19, wherein the prioritized status indication is a first prioritized status indication, wherein the first status indication comprises a first first status indication, wherein the status message is a first status message, and wherein the operations further comprise:
increasing the third baseline notification priority by the third notification priority increment to result in an increased notification priority that is higher than the first baseline notification priority;

determining a second first status indication corresponding to the first traffic flow;

based on the increased notification priority being higher than the first baseline notification priority, prioritizing the third status indication with respect to the second first status indication to result in a second prioritized status indication that comprises the third status indication;

determining a second uplink control channel resource occasion, configured to occur after the first uplink control channel resource occasion, having a second capacity that is capable of facilitating transmission of the second prioritized status indication and that is incapable of facilitating transmission of the of the second prioritized status indication and the second first status indication; and transmitting, to the radio network node via the second uplink control channel resource occasion, a second status message that comprises the second prioritized status indication, wherein the second status message excludes the second first status indication.

\* \* \* \* \*